United States Patent Office 3,238,203
Patented Mar. 1, 1966

3,238,203
BASIC ESTERS OF N-ALKENOYLANTHRANILIC ACID
John Krapcho, Somerset, N.J., assignor to Olin Mathieson Chemical Corporation, New York, N.Y., a corporation of Virginia
No Drawing. Filed Oct. 12, 1962, Ser. No. 230,286
8 Claims. (Cl. 260—247.2)

This invention relates to bases of the formula (I) 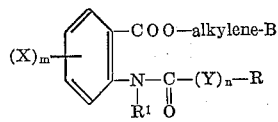

and to acid addition salts and quaternary ammonium salts thereof.

The symbols in Formula I have the following meanings:

B represents a basic nitrogen containing radical of less than 12 carbon atoms.

R represents hydrogen, lower alkyl, $(X)_m$-phenyl, furyl, thienyl, pyridyl and piperonyl.

$R^1$ represents hydrogen, lower alkyl and aralkyl.

X represents hydrogen, halo, lower alkyl, lower alkoxy, hydroxy, lower alkylthio, lower alkanoyl, trihalomethyl, nitro, amino and dialkylamino.

Y represents lower alkenylene and lower alkynylene.

$m$ represents 1, 2 and 3.

$n$ represents 1 and 2.

The lower alkyl groups represented by R, $R^1$ and X include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atoms. The term "alkylene" includes such straight and branched chain aliphatic groups having up to about 14 carbon atoms, but lower alkylene groups are preferred.

The unsaturated groups represented by Y are divalent straight or branched chain groups containing one carbon to carbon double bond (lower alkenylene) or one carbon to carbon triple bond (lower alkynylene) illustrated by the following: —CH=CH—, —CH₂—CH=CH—,
—CH₂—CH=CH—CH₂—

—ĊH—CH=CH—, —C=CH—
   CH₃                CH₃

—C≡C—, —CH₂—C≡C—, and the like.

Each of the four halogens is contemplated by the terms "halo" and "trihalomethyl," but in the case of the halogens themselves chlorine and bromine are preferred while trifluoromethyl is the preferred trihalomethyl group.

The lower alkanoyl groups represented by X are the acyl moieties derived from lower fatty acids containing alkyl groups of the character described above and include, for example, acetyl, propionyl, butyryl and the like.

R represents a phenyl group or a phenyl group which contains one to three substituents represented by the symbol X. Illustrative of the substituted phenyl groups are the following: o-, m- and p-chlorophenyl, o-, m- and p-bromophenyl, o-, m- and p-nitrophenyl, 3,4-dinitrophenyl, 2,5 - dichlorophenyl, 2,3 - dibromophenyl, 3,4 - dichlorophenyl, o-, m- and p-tolyl, o-, m- and p-xylyl, mesityl, p-methoxyphenyl, p-ethoxyphenyl, p-acetylphenyl, o-, m- and p-trifluoromethylphenyl, o-, m- and p-trichloromethyl-phenyl, 3,4 - di(trifluoromethyl)phenyl, 2 - hydroxyphenyl, 3 - aminophenyl, 3 - dimethylaminophenyl and 4-ethylthiophenyl.

$R^1$ represents aralkyl groups which include mono- and bicyclic hydrocarbon rings attached to alkyl groups especially up to 12 carbon atoms. Preferably, this symbol represents $(X)_m$-phenyl-lower alkyl wherein $(X)_m$-phenyl and lower alkyl are the same described above and this includes, for example, benzyl, phenethyl, 4-nitrophenethyl, chlorobenzyl, bromobenzyl, dichlorobenzyl, 4-methoxybenzyl and the like.

The basic nitrogen containing radicals symbolized by B may be represented by the formula (II) 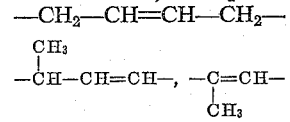

wherein each $R^2$ represents hydrogen, lower alkyl, hydroxy-lower alkyl, phenyl-lower alkyl and N-(lower alkyl)phenyl(lower alkyl) forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di-(hydroxyethyl)amino, phenyl(lower alkyl)amino, e.g., benzylamino, phenethylamino, N-(lower alkyl)-phenyl-(lower alkyl)amino, e.g., N-methylbenzylamino, and the like.

In addition the nitrogen may join with the groups represented by $R^2$ to form a 5 to 7 membered monocyclic heterocyclic containing, if desired, an oxygen, sulfur or an additional nitrogen atom, not more than two hetero atoms altogether, that is, the two symbols $R^2$ represent together a tetramethylene, pentamethylene, hexamethylene, oxatetramethylene, oxaphentamethylene, azahexamethylene, azatetramethylene, azapentamethylene, thiapentamethylene or thiatetramethylene. The heterocyclic group may also be substituted by one or two groups represented by X.

Thus heterocyclic groups represented by B include, for example, piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4-piperidyl, 2-, 3- or 4-(N-lower alkylpiperidyl), e.g., 2-, 3- or 4-(N-methylpiperidyl), pyrrolidino, (lower alkyl) pyrrolidino, e.g., methylpyrrolidino, di(lower alkyl)pyrrolidino, e.g., ethoxypyrrolidino, 2- or 3-pyrrolidyl, 2- or 3-(N-lower alkylpyrrolidyl), e.g., 2- or 3-(N-methylpyrrolidyl), morpholino, (lower alkyl)morpholino, e.g., N-methylmorpholino or 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., N-methylthiamorpholino or 2-methylthiamorpholino, di(lower alkyl)thiamorpholino, e.g., 2,3-dimethylthiamorpholino, (lower alkoxy)thiamorpholino, e.g., 2 - methoxythiamorpholino, piperazino, (lower alkyl)piperazino, e.g., $N^4$-methylpiperazino, 2-methylpiperazino, di(lower alkyl) piperazino, e.g., 2,3-dimethylpiperazino, hexamethyleneimino and homopiperazino.

The preferred members of the class defined by Formula I are those wherein X is hydrogen, Y is lower alkenylene, R is phenyl, $R^1$ is hydrogen or lower alkyl, especially methyl, B is di-lower-alkylamino, especially dimethylamino and diethylamino, $m$ represents 1, $n$ represents 1 and the alkylene group has 2 or 3 carbon atoms, especially 2.

The compounds of the Formula I may be produced by reacting a compound of the formula (III)
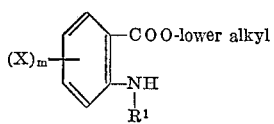

with a basic alcohol of the formula (IV)        HO-alkylene-B to give the intermediate of the formula (V)
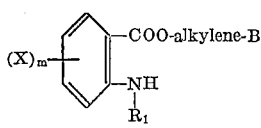

The reaction is carried out in refluxing xylene containing a trace of sodium as a catalyst and the mixture heated until the evolution of alkanol is complete. The product is purified by distillation and the o-amino compound thus obtained is finally reacted with a compound of the formula (VI)
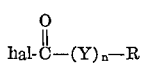

in an inert solvent such as chloroform, benzene, ether or the like at a temperature from about room temperature to reflux temperature.

Alternatively, compounds of Formula I are obtained by reaction of a compound of the formula (VII)
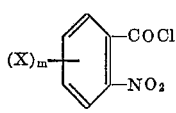

with a compound of Formula IV to give compounds of the formula (VIII)
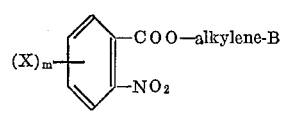

Catalytic reduction of this class of compounds gives compounds of the general Formula V, wherein $R^1$ is H. To prepare the compounds wherein $R^1$ is other than hydrogen, a compound of the formula (IX)
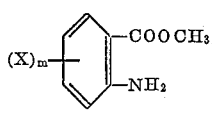

is reacted with the appropriate aldehyde in the presence of hydrogen and a hydrogenation catalyst to yield compounds of the general Formula III wherein $R^1$ is alkyl or aralkyl. These compounds are reacted with IV to yield products of the general Formula V and then the same final step, previously described, is carried out.

The symbols used above are the same as in Formula I and hal refers to halogen, preferably chlorine or bromine.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate, or the like.

The compounds of this invention are therapeutically active substances which possess seroton inhibitory and hypotensive activities. They are useful in the treatment of conditions such as hypertension. They may be administered orally or parenterally in the form of tablets, capsules, elixirs, injectables or the like by incorporating the appropriate dosage of the base of Formula I or a physiologically acceptable acid addition salt of quaternary ammonium salt thereof in a conventional vehicle according to accepted pharmaceutical practice.

The following examples are illustrative of the invention. All temperatures are expressed on the centigrade scale.

EXAMPLE 1

*Anthranilic acid, N-cinnamoyl-2-dimethylaminoethyl ester hydrochloride*

(A) PREPARATION OF ANTHRANILIC ACID, 2-DIMETHYLAMINOETHYL ESTER

A mixture of 151 g. of anthranilic acid, methyl ester, 100 g. of 2-dimethylaminoethanol, 500 ml. of xylene and 0.1 g. of sodium is refluxed for twelve hours. The resulting mixture is fractionated to give anthranilic acid, 2-dimethylaminoethyl ester as a colorless liquid.

Alternatively, 185 g. of o-nitrobenzoyl chloride is reacted with 89 g. of 2-dimethylaminoethanol in chloroform solution to give o-nitrobenzoic acid, 2-dimethylaminoethyl ester. Catalytic reduction of this material gives anthranilic acid, 2-dimethylaminoethyl ester.

(B) PREPARATION OF ANTHRANILIC ACID, N-CINNAMOYL-2-DIMETHYLAMINOETHYL ESTER HYDROCHLORIDE

A solution of 16 g. of material from part (A) in 100 ml. of chloroform is added dropwise to a cold solution of 17 g. of cinnamoyl chloride in 200 ml. of chloroform. The mixture is refluxed for thirty minutes, cooled and diluted with 700 ml. of ether to give anthranilic acid, N-cinnamoyl-2-dimethylaminoethyl ester hydrochloride as a crystalline solid. Treatment of this material with one equivalent of sodium hydroxide gives the free base.

EXAMPLE 2

*Anthranilic acid, N-cinnamoyl-1-dimethylamino-2-propyl ester hydrochloride*

By substituting an equivalent quantity of 1-dimethylamino-2-propanol for the 2-dimethylaminoethanol in Example 1, anthranilic acid, N-cinnamoyl-1-dimethylamino-2-propyl ester hydrochloride is obtained.

EXAMPLE 3

*Anthranilic acid, N-cinnamoyl-2-morpholinoethyl ester hydrochloride*

By substituting an equivalent quantity of 2-morpholinoethanol for 2-dimethylaminoethanol in Example 1, anthranilic acid, N-cinnamoyl-2-morpholinoethyl ester hydrochloride is obtained.

EXAMPLE 4

*Anthranilic acid, N-cinnamoyl-3-(4-methylpiperazino) propyl ester hydrochloride*

By substituting an equivalent amount of 3-(4-methylpiperazino) propanol for 2-dimethylaminoethanol in Example 1, anthranilic acid, N-cinnamoyl-3-(4-methylpiperazino)propyl ester hydrochloride is obtained.

EXAMPLE 5

*Anthranilic acid, N-cinnamoyl-5-methoxy-2-dimethylaminoethyl ester hydrochloride*

By substituting 5-methoxyanthranilic acid, methyl ester for the methyl ester of anthranilic acid in Example 1, anthranilic acid, N-cinnamoyl-5-methoxy-2-dimethyl-aminoethyl ester hydrochloride is obtained.

EXAMPLE 6

*Anthranilic acid, N-cinnamoyl-N-methyl-2-dimethyl-aminoethyl ester hydrochloride*

By substituting N-methylanthranilic acid, methyl ester for the anthranilic acid, methyl ester in Example 1, anthanilic acid, N-cinnamoyl-N-methyl-2-dimethylaminoethyl ester hydrochloride is obtained.

EXAMPLE 7

*Anthranilic acid, N-cinnamoyl-N-phenethyl-2-dimethyl-aminoethyl ester hydrochloride*

(A) PREPARATION OF ANTHRANILIC ACID, N-PHENETHYL-METHYL ESTER

A mixture of 30 g. of anthranilic acid, methyl ester and 25.0 g. of phenylacetaldehyde in 100 ml. of ethanol is treated with 3 g. of Raney nickel catalyst and the mixture placed under thirty atmospheres of hydrogen. After the absorption of hydrogen is complete, the mixture is filtered and the solvent evaporated from the filtrate. Fractionation of the residue gives anthranilic acid, N-phenethyl-methyl ester.

(B) PREPARATION OF ANTHRANILIC ACID, N-CINNAMOYL - N - PHENETHYL-2-DIMETHYLAMINOETHYL ESTER HYDROCHLORIDE

By substituting an equivalent quantity of the material from part (A) for the anthranilic acid, methyl ester in Example 1, anthranilic acid, N-cinnamoyl-N-phenethyl-2-dimethylaminoethyl ester hydrochloride is obtained.

EXAMPLE 8

*Anthranilic acid, N-crotonoyl-2-dimethylaminoethyl ester hydrochloride*

By substituting an equivalent quantity of crotonoyl chloride for the cinnamoyl chloride in Example 1, anthranilic acid, N-crotonoyl-2-dimethylaminoethyl ester hydrochloride is obtained.

EXAMPLE 9

*Anthranilic acid, N-sorboyl-2-dimethylaminoethyl ester hydrochloride*

By substituting an equivalent amount of sorboyl chloride in place of the cinnamoyl chloride in Example 1, anthranilic acid, N-sorboyl-2-dimethylaminoethyl ester hydrochloride is obtained.

EXAMPLE 10

*Anthranilic acid, N-α-methylcinnamoyl-2-dimethyl-aminoethyl ester hydrochloride*

By substituting an equivalent amount of α-methylcinnamoyl chloride for the cinnamoyl chloride in Example 1, anthranilic acid, N-α-methylcinnamoyl-2-dimethylaminoethyl ester hydrochloride is obtained.

EXAMPLE 11

*Anthranilic acid, N-phenylpropioloyl-2-dimethylamino-ethyl ester hydrochloride*

By substituting an equivalent quantity of phenylpropiloyl chloride for cinnamoyl chloride in Example 1, anthranilic acid, N-phenylpropioloyl-2-dimenthylamino-ethyl ester hydrochloride is obtained.

EXAMPLE 12

*Anthranilic acid, N-β-(2-thiophene)acryloyl-2-dimethyl-aminoethyl hydrochloride*

By substituting the acid chloride of β-(2-thiophene) acrylic acid for the cinnamoyl chloride in Example 1, anthranilic acid, N-β-(2-thiophene)acryloyl-2-dimethyla-minoethyl ester hydrochloride is obtained.

EXAMPLE 13

*Anthranilic acid, N-cinnamoyl-2-dimethylaminoethyl ester methochloride*

A solution of 5 g. of the free base of anthranilic acid, N-cinnamoyl-2-dimethylaminoethyl ester from Example 1 in 20 ml. of acetonitrile is cooled and treated with 10 g. of methyl chloride. After standing for one day at room temperature, the mixture is diluted with 200 ml. of ether to give anthranilic acid, N-cinnamoyl-2-dimethylaminoethyl ester methochloride as a colorless solid.

This invention may be variously otherwise embodied within the scope of the appended claims.

What is claimed is:

1. A compound selected from the group consisting of bases of the formula

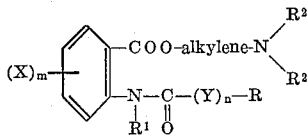

wherein R represents a member of the group consisting of hydrogen, lower alkyl, $(X)_m$-phenyl, furyl, thienyl, pyridyl and piperonyl; $R^1$ represents a member of the group consisting of hydrogen, lower alkyl and $(X)_m$-phenyl-lower alkyl; $R^2$ represents a member of the group consisting of hydrogen, lower alkyl, hydroxy-lower alkyl, phenyl-lower alkyl and N-(lower alkyl)phenyl(lower alkyl) and the two symbols $R^2$ together represent a member of the group consisting of tetramethylene, pentamethylene, hexamethylene, oxatetramethylene, oxapentamethylene, azatetramethylene, azapentamethylene, azahexamethylene, thiatetramethylene and thiapentamethylene, each of said members bearing the group X; X represents a member of the group consisting of hydrogen, halo, lower alkyl, lower alkoxy, hydroxy, lower alkylthio, lower alkanoyl, trihalomethyl, nitro, amino and dialkylamino; Y represents a member of the group consisting of lower alkenylene and lower alkynylene; $m$ represents an integer from 1 to 3; and $n$ represents an integer from 1 to 2; and acid addition salts and quaternary ammonium salts of said bases.

2. A compound of the formula

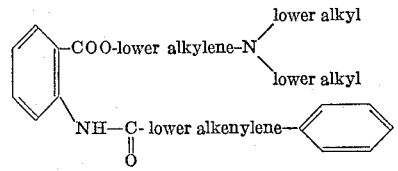

3. Physiologically acceptable acid addition salts of compounds of claim 2.

4. Anthranilic acid, N-cinnamoyl-2-dimethylaminoethyl ester.

5. Anthranilic acid, N-cinnamoyl-dimethylamino-2-propyl ester.

6. Anthranilic acid, N-cinnamoyl-2-morpholinoethyl ester.

7. Anthranilic acid, N-cinnamoyl-3-(4-methylpiperazino)propyl ester.

8. Anthranilic acid, N-cinnamoyl-5-methoxy-2-dimethylaminoethyl ester.

References Cited by the Examiner

UNITED STATES PATENTS 2,623,045   12/1952   Schlesinger et al. _____ 260—247.2

LORRAINE A. WEINBERGER, *Primary Examiner.*

D. D. HORWITZ, *Examiner.*

L. A. THAXTON, *Assistant Examiner.*